(12) United States Patent
Shelton

(10) Patent No.: US 10,999,984 B1
(45) Date of Patent: May 11, 2021

(54) IRRIGATION LINE CLIP AND IRRIGATION SYSTEM

(71) Applicant: SURAIN INDUSTRIES, INC., Sumner, WA (US)

(72) Inventor: Doug Shelton, Sumner, WA (US)

(73) Assignee: Surain Industries, Inc., Sumner, WA (US)

( * ) Notice: Subject to any disclaimer, the term of this patent is extended or adjusted under 35 U.S.C. 154(b) by 171 days.

(21) Appl. No.: 16/237,669

(22) Filed: Dec. 31, 2018

Related U.S. Application Data

(60) Provisional application No. 62/612,611, filed on Dec. 31, 2017.

(51) Int. Cl.
| | |
|---|---|
| *A01G 27/00* | (2006.01) |
| *F16M 13/02* | (2006.01) |
| *A01G 9/24* | (2006.01) |
| *A01G 9/02* | (2018.01) |

(52) U.S. Cl.
CPC ............ *A01G 27/008* (2013.01); *A01G 9/02* (2013.01); *A01G 9/247* (2013.01); *F16M 13/02* (2013.01); *A01G 27/001* (2013.01)

(58) Field of Classification Search
CPC ........ A01G 25/16; A01G 31/06; A01G 25/02; A01G 25/023; A01G 27/005; A01G 9/023; A01G 9/247; A01G 27/008; A01G 2025/006; A01G 25/09; A01G 27/001; F21V 21/088; A45D 8/20
See application file for complete search history.

(56) References Cited

U.S. PATENT DOCUMENTS

| | | | | |
|---|---|---|---|---|
| 5,220,745 A | * | 6/1993 | Elliott ................... | A01G 27/005 47/62 R |
| 5,473,838 A | * | 12/1995 | Denbigh .............. | A01G 27/005 248/104 |
| 2009/0230256 A1 | * | 9/2009 | Widlacki ................ | F16L 3/222 248/68.1 |
| 2014/0259620 A1 | * | 9/2014 | Hicks ...................... | F16L 3/223 29/525.01 |
| 2016/0346802 A1 | * | 12/2016 | McCaslin ............. | B05B 15/622 |

\* cited by examiner

*Primary Examiner* — Timothy D Collins
*Assistant Examiner* — Brittany A Lowery
(74) *Attorney, Agent, or Firm* — DWC Law Firm, P.Ss

(57) ABSTRACT

Apparatus, systems and methods are provided for retaining irrigation line configuration relative to an array of plant containers. A plurality of irrigation line clips are configured to releasably lock to the plant containers. The plant containers are each provided with a plurality of apertures for receiving the irrigation line clips, the apertures being arranged in different locations along rims of the plant containers. The clips can be provided with a semi-ring component for use in quick attachment to an irrigation line.

11 Claims, 4 Drawing Sheets

IRRIGATION LINE CLIP AND IRRIGATION SYSTEM

CROSS REFERENCE TO RELATED APPLICATION(S)

This application claims the benefit of U.S. provisional patent application No. 62/612,611, filed Dec. 31, 2017, which is incorporated herein by reference in its entirety.

BACKGROUND

1. Technical Field

The present disclosure relates to irrigation apparatus and systems, and more particularly, to methods and structures for attaching irrigation lines to plant containers and systems employing the same.

2. Description of Related Art

Commercial, as well as private, plant nurseries often employ large scale irrigation systems that are designed to water individual plants planted in separate plant containers (e.g., plant pots or pottery) that may be dispersed throughout such nurseries and that may be organized into rows and rows of containers. These irrigation systems often employ a network of irrigation lines and emitters that are designed to deliver water to each plant container. There are two main types of emitters—those that allow water to drip or seep onto or around plants (e.g., drip irrigation) and those that direct water into the air like a miniature sprinkler head.

Some prior art irrigation systems comprise numerous branch emitter lines that branch off from main irrigation lines (header lines), with an individual branch line positioned to irrigate each container in an array of containers within a nursery. Such irrigation systems are often difficult and time consuming to assemble and implement, particularly on a large scale.

In other prior art irrigation systems, spring loaded clips are used to directly bind irrigation lines against the rims of containers, gripping the irrigation lines directly against the containers or under pressure of the clips. Such systems are also difficult to implement on a large scale and have a tendency to impede water flow.

Further, such prior art irrigation systems as described above tend to be somewhat inflexible such that once these systems are set up, it is difficult and time consuming to move the irrigation lines in order to, for example, accommodate the plants that they are hydrating as they grow from small seedlings to larger plants.

BRIEF SUMMARY

In some embodiments, an irrigation system comprises a plurality of irrigation line clips, each irrigation line clip including a semi-ring component for retaining a portion of an irrigation line. Also, each irrigation line clip can include a pair of legs with a gap therebetween with each of the legs having an outwardly protruding catch member formed thereon, and with each of the irrigation line clips also being resilient and compressible to permit a user to squeeze the at least a pair of legs together for insertion into a restrictive aperture on a plant container.

The irrigation system also includes a plurality of containers, each container including a plurality of apertures formed on rim walls at different locations thereof for use in selectively receiving at least one of the irrigation line clips in each aperture, in a manner such that the clips can be releasably locked to the container.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

Figure 1:
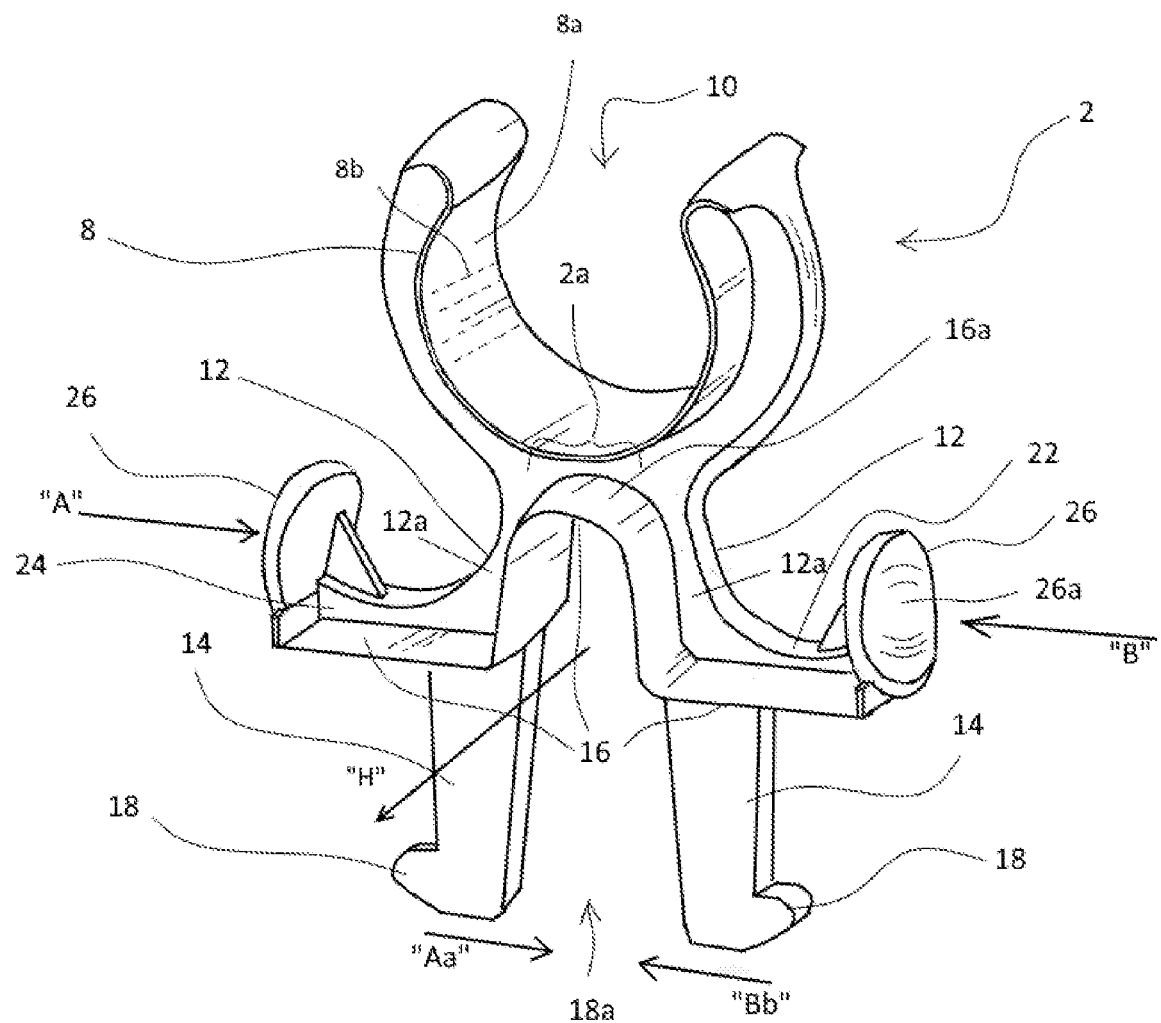
FIG. 1 is a front perspective view of an irrigation line clip ("IL clip") according to some embodiments of the present disclosure.
Figure 2:
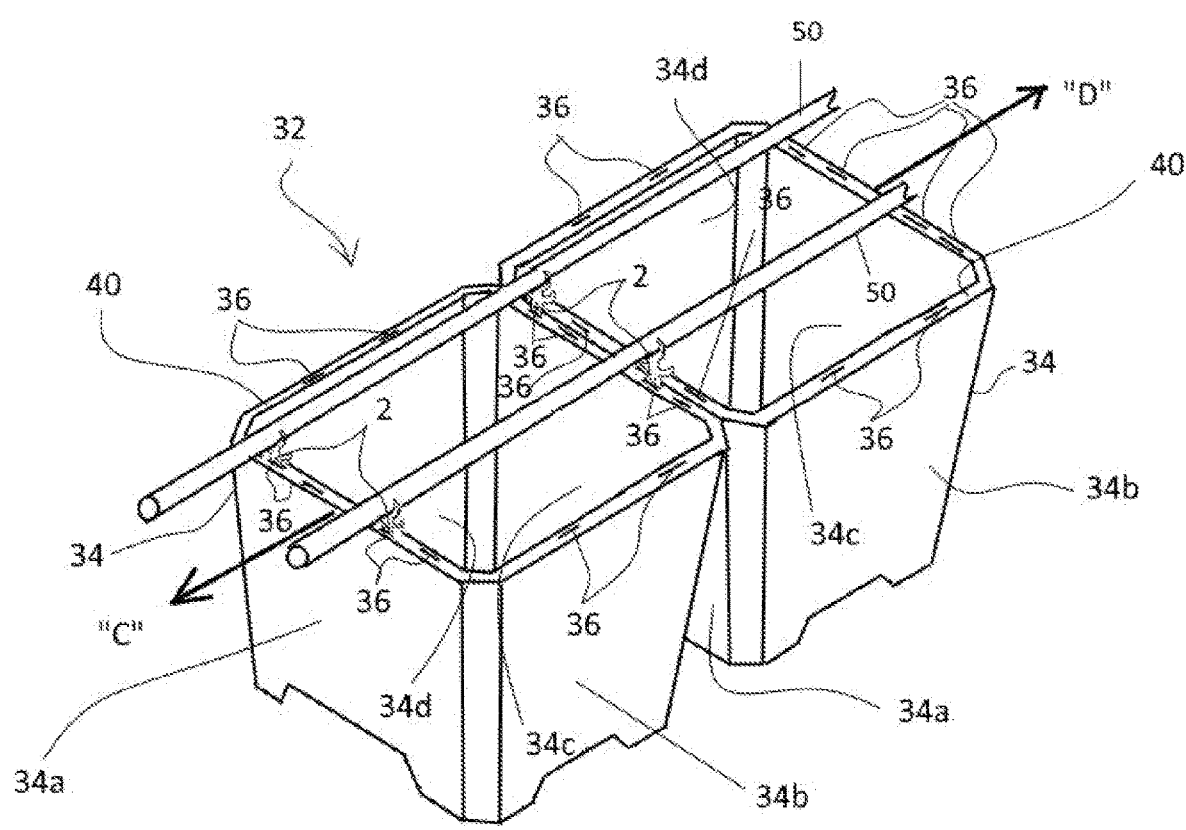
FIG. 2 is a partial perspective view of an example irrigation system for some embodiments of the present disclosure, including containers having elongated apertures for receiving and retaining one or more IL clips of FIG. 1 per container, and one or more irrigation lines being retained by the IL clips in order retain the position of emitters on the irrigation lines at selected positions relative to the containers.

Referring to FIGS. 1 and 2, in some embodiments of the present disclosure, an irrigation line clip (also referred to herein as an "IL clip") 2, is provided that may be configured for use in retaining a portion of an irrigation line 50 at a selected position relative to a plant container (hereinafter "container") 34. By employing a plurality of such IL clips 2 releasably secured to the containers 34, one or more irrigation lines 50 can be retained in an organized and efficient manner relative to the containers for use in irrigating plant life (e.g., seedlings or plants).

Referring to FIG. 1, the IL clip 2 includes among other things a semi-ring component 8 having a receiving gap 10.

The semi-ring component 8 is connected to, or formed with, at a lower portion thereof, two downwardly extending elongated leg members 12, each leg member 12 having an upper section 12a, and a lower section 14, the lower section 14 being formed below a shield member 16 of the IL clip 2. The shield member 16 extends forward from arm members 22, 24, and laterally across a width of the IL clip 2, from an end portion of a left arm member 22 of the IL clip, to an opposite end portion of a right arm member 24 of the IL clip. In some embodiments, the shield member 16 includes a shield arch section 16a near a lateral central portion of the IL clip 2 (also laterally central relative to the shield member 16), which comprises an upward arch at a central portion of the shield member 16.

A catch member 18, or foot member, protrudes laterally outwardly from an end portion of the lower section 14 of each leg member 12 and a gap 18a exists between the pair of leg members 12 that spans from immediately below the shield arch section 16a downward to the bottom of the leg members 12.

In some embodiments, a press pad 26 is disposed outward of the distal end portion of each arm member 22, 24, and connected thereto, with a press pad surface 26a on each press pad 26 facing outwardly, such that, in some embodiments, a user can place a finger on one press pad surface 26a, and a corresponding thumb on the opposite press pad surface 26a, and squeeze the press pads 26 toward each other manually to cause the leg members 12 to pivot and/or bend inward, about a lateral central portion 2a of the IL clip, such as, for example, about the shield arch section 16a, thereby drawing the catch members 18 closer together than a resting position thereof. In some embodiments, the IL clip 2, and/or the leg members 12, shield arch section 16a, or a laterally central portion 2a of the IL clip, is/are constructed of resilient material with spring characteristics, and can be compressed by manual force applied by user's hand, namely, by squeezing between a thumb and finger. As such, in a resting state, such as illustrated in FIG. 1, the catch members 18 of the IL clip 2 are in an extended position, but when a user squeezes the press pads 26 together (toward one another), in the directions generally or approximately illustrated shown by arrows "A" and "B", the catch members 18 are also displaced inward toward one another in the directions generally or approximately illustrated by arrows "Aa" and "Bb," and then when a user releases pressure from the press pads 26, catch members 18 spring back to the resting state in the extended position illustrated in FIG. 1.

In various embodiments, the IL clip 2 may be made of a single resilient unitary material. For example, in some cases, the IL clip 2 may be of any one of a variety of molding techniques, as will be appreciated by those skilled in the art after reviewing this disclosure.

In some embodiments, and without limitation, a height of the IL clip 2 ("height" referring to the a maximum vertical length of the IL clip 2 relative to its orientation shown in FIG. 1) is between 5 cm and 12 cm, or otherwise less than or more than 12 cm, and a maximum width of the IL clip 2 as measured from the outermost portions of the press pads 26 may be between 5 cm and 102 m, or less than or more than 12 cm.

Referring to FIG. 2, in some embodiments of the present disclosure, an irrigation system 32 includes a plurality of containers 34, each containing substance requiring irrigation, such as, for example, plants (which may include seedlings, etc.), and each of the container 34 may be aligned or arranged in adjacent fashion for storage/growing of plants, such as in a nursery or other type of facility where many containers 34 are used simultaneously and require irrigation. Only two containers 34 are shown in FIG. 2 for illustration purposes only, but any number of containers 34 could be arranged in proximity to one another, or adjacent one another, and in any of a variety of arrangements. For example, in FIG. 2, without limitation, the containers 34 are generally rectangular in perimeter (but may be other shapes in other embodiments), each having four perimeter walls (34a, 34b, 34c, and 34d), and are aligned with at least one or more of the perimeter walls proximate or abutting a perimeter wall of an adjacent container. Although only two containers are shown in FIG. 2, additional containers could be aligned in substantially the same fashion with the illustrated containers, proximate the illustrated containers 34, in the directions of arrows "C" and "D," against the perimeter wall 34c of the container 34 on the right in the FIG. 2, and against the perimeter wall 34a of the container 34 on the left in FIG. 2, and so on. Additional containers could also be aligned against the perimeter walls 34b of each of the illustrated containers 34, and so on, to form a matrix of containers expanding on all four sides of each of the containers 34, or could otherwise be arranged to leave a linear pathway between lines of container 34, as will be appreciate by those skilled in the art after reviewing this disclosure.

Still referring to FIG. 2, each of the containers 34 can include one or more apertures 36, which may be elongated in the form of slots in some embodiments and formed on upper rims 40 of the perimeter walls of the containers. In some embodiments, the rim 40 of each perimeter wall (34a, 34b, 34c, and 34d), or one or more perimeter walls, may have one or more elongated apertures 36 formed thereon, with a length of the elongated apertures 36 extending along an axis of the rim 40.

Figure 3:
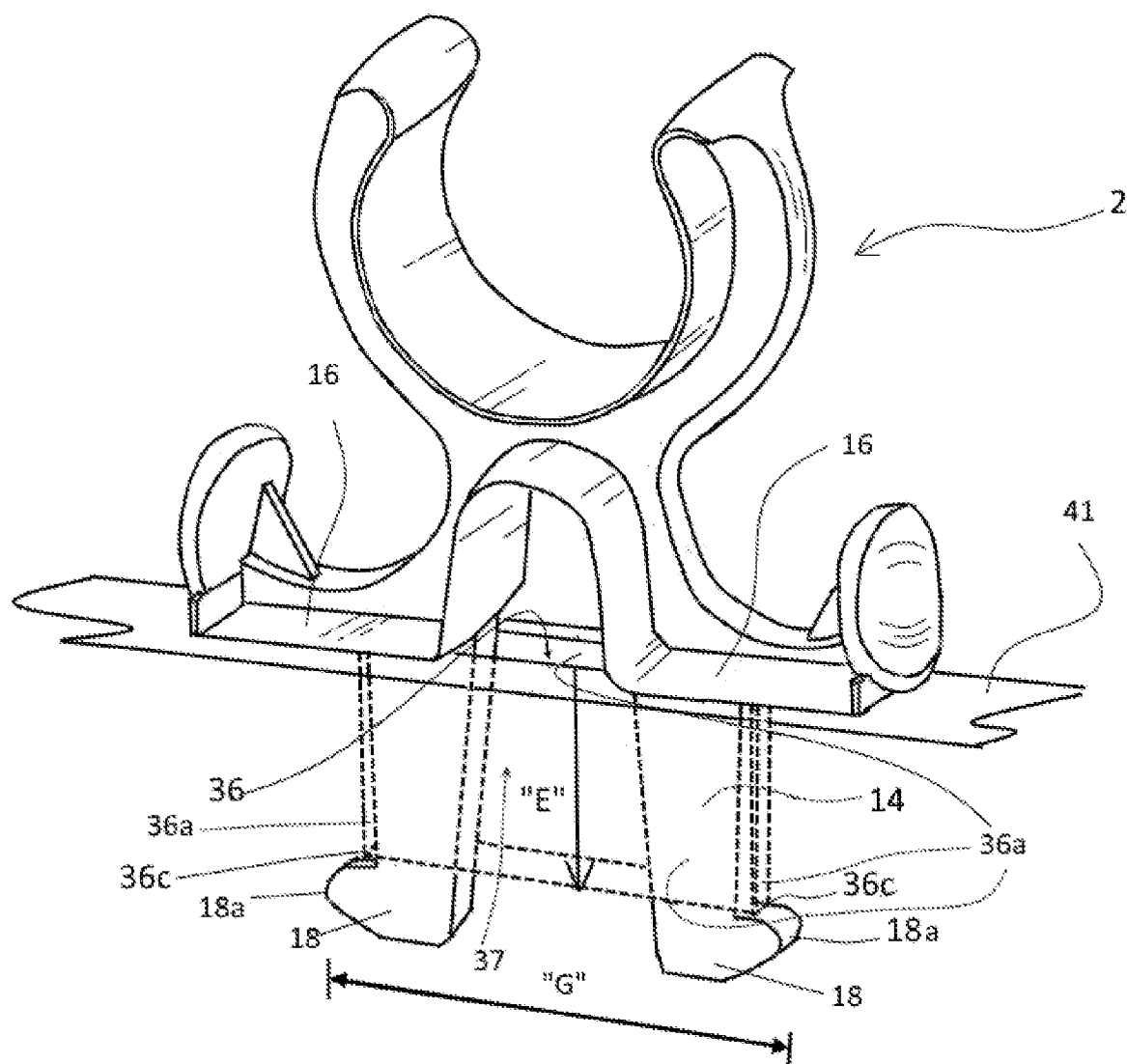
FIG. 3 is an enlarged partial perspective view of an IL clip of FIG. 2 having been inserted into an elongated aperture on a plant container of FIG. 2, and further showing a downwardly extending interior sidewall that extends downward from proximate a perimeter edge of the aperture.
Figure 4:
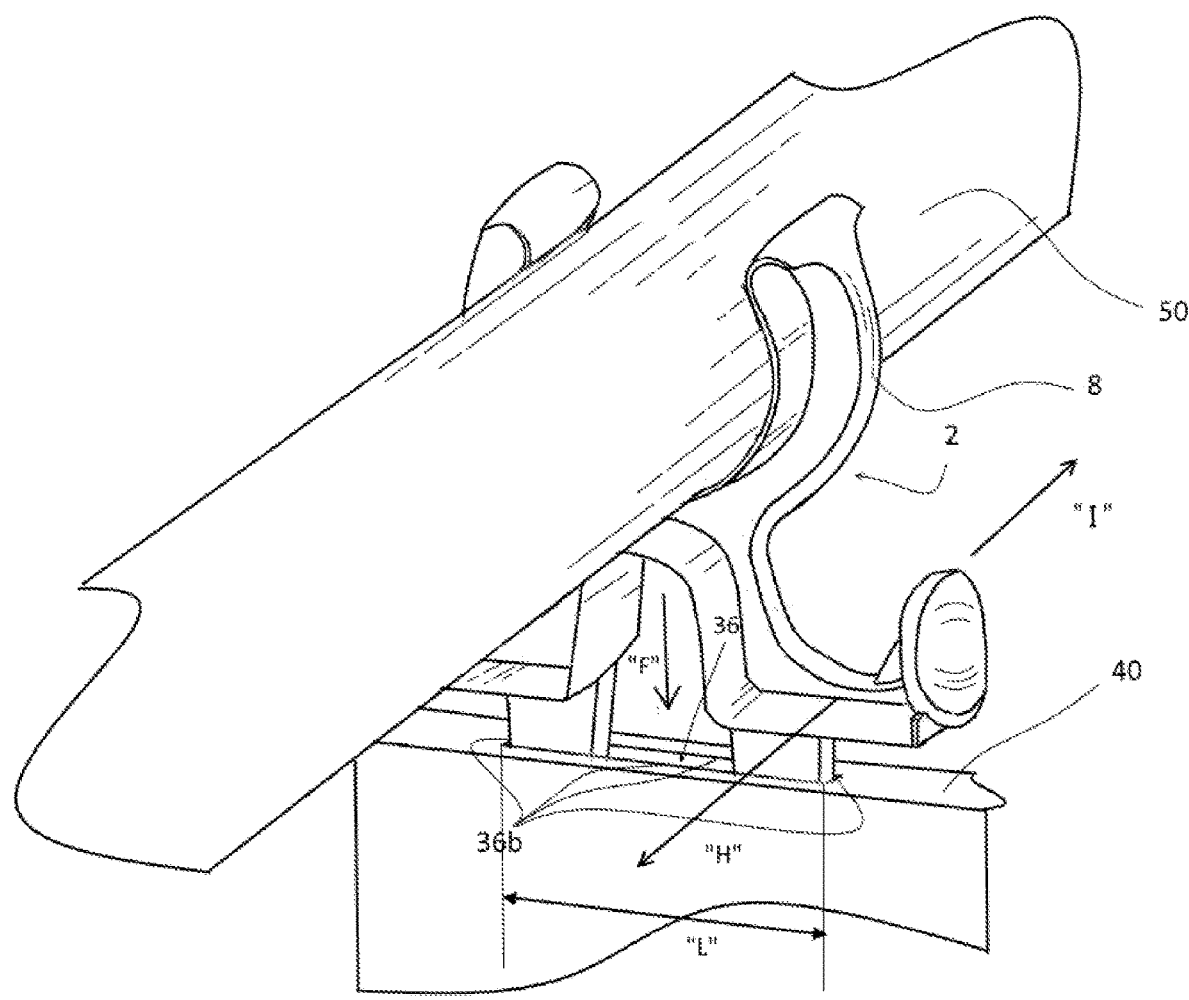
FIG. 4 is an enlarged partial perspective of an IL clip of FIG. 2 partly inserted in a container aperture of FIG. 2, with an irrigation line attached thereto with the semi-ring component of the IL clip (Note that the irrigation line is shown as attached to the IL clip in FIG. 4; however, as will be appreciated by those skilled in the art upon review of this disclosure, the IL clips may be inserted into the slots before the irrigation line is attached).

Referring to FIGS. 3 and 4, the elongated apertures 36 on the rims 40 can each include a depth "E" defined by a downwardly extending interior sidewall 36a for each elongated aperture 36, the downwardly extending interior sidewall 36a extending downward from a rim wall 41 on which is formed the perimeter edge 36b surrounding or defining the aperture 36. The downwardly extending interior sidewall 36a (shown as dash line in FIG. 3 as it is an interior surface), can extend downward from all or a portion of the rim wall 41 proximate the perimeter edge 36b, to form an interior channel 37 of the aperture 36, into which the lower sections 14 of the leg members 12 can be inserted. However, in some embodiments, a maximum diameter or length "L" (See, e.g., FIG. 4) of the aperture 36 is less than a width "G" (See, e.g., FIG. 3) as measured from opposite distal end portions of the catch members 18 when the IL clip is in resting state (uncompressed), such width "G" defining the maximum width of the IL clip below the shield member 16, so that a user must first compress the IL clip, such as by squeezing the press pads 26 toward one another, before inserting the lower section 14 of the leg members 12 into the aperture 36. That is, a user can squeeze the press pads 26 together, to compress the IL clip 2 so that the width "G" is less than the resting state width "G," and less than the length "L" of the aperture, then insert the lower sections 14 into the aperture in the direction of arrow "F" as shown in FIG. 4. It is noted that although FIG. 4 shows an irrigation line 50 connected the IL clip 2, in practice, the IL clip 2 will often be inserted into the aperture 36 without the irrigation line 50 having been connected to the IL clip 2. That is, in some embodiments, the containers 34 of the irrigation system 32 are prepared by attaching a plurality of IL clips 2 to the containers 34 (without irrigation lines connected to the IL clips), then, after the IL clips 2 are attached, the irrigation lines 50 are connected to the IL clips 2. In other embodiments, the IL clips 2 can be moved or rearranged on the containers 34 even while the irrigation line 50 is attached thereto, such as when the irrigation system 32 is being rearranged, etc., and a variety of combinations of such steps are contemplated as will be appreciated by those skilled in the art after reviewing this disclosure.

As can be seen in FIGS. 3 and 4, after the lower section 14 of the leg members 12 is inserted into the aperture 36, and pushed downward in the direction of arrow "F," the catch members 18 can extend below a bottom edge 36c of the interior sidewall 36a, and spring back outward, or "pop back," to their resting state, in which the distal end portions 18a defining width "G" are again, wider than the length "L" of the aperture 36, and wider than a distance between bottom edge 36c sections of the interior sidewall 36a that abut against the lower sections 14 of the leg members 12. In this manner, the IL clip can be releasably locked to the container 34 in a selected aperture 36. Moreover, when a user wishes to release the IL clip 2 from a corresponding aperture 36, such as to reconfigure the irrigation system 2 or disassembly it, the user can squeeze the press pads 26 of the IL clip together to compress the width "G" and then pull the IL clip 2 away from the aperture 36.

As can be seen in FIGS. 3 and 4, in some embodiments, when the IL clip 2 is locked into the container 34 aperture 36, the shield member 16 of the IL clip 2, which can extend forward in the direction of arrow "H" from the arm members 22 and 24, as well as from the central portion 2a, blocks or covers the aperture 36 from vertical exposure, and extends forward and outward past the perimeter edge 36b of the aperture 36. In some embodiments, the IL clip 2 is symmetrically shaped/constructed on the front side (facing in the direction of arrow "H") and back side (facing in the direction of arrow "I"), so that a shield member 16 extends to cover the aperture 36 from the back side of the IL clip 2 also. In some embodiments, the shield member 16 has a substantially flat configuration both laterally and outwardly (forward or backward) except for the shield arch 16a, which curves as it extends laterally, but does not curve as it extends forward or backward.

As best seen in FIGS. 1, 2 and 4, in various embodiments, a user can clip a portion of an irrigation line 50 into the semi-ring component 8 of the IL clip 2, such as by, for example, pressing the irrigation line (usually flexible) through the receiving gap 10. When a plurality of the IL clips 2 are selectively positioned and attached to a plurality of containers 36, such as illustrated by way of example as described above, a user can efficiently arrange irrigation lines 50 relative to the containers 34, and retain the irrigation lines 50 by attaching each irrigation line 50 to multiple IL clips dispersed and attached among the container 34 in user selected configuration.

Referring to FIG. 1, in some embodiments, the semi-ring component 8 of the IL clip 2 may have an interior surface 8a that is textured 8b to help provide friction against an irrigation line 50 attached thereto from moving or shifting down a line of containers as illustrated, for example, in FIG. 2. By preventing such movement, liquid emitters (not shown) on an irrigation line 50 that are disposed along the irrigation line remain spatially fixed over their respective containers over which they were positioned by a user. For example, many growers or plant nurseries will often prefer that a certain number of emitters (e.g., two emitters) are stationary fixed over each plant container. By having a textured surface 8b in the interior side of the semi-ring components of IL clips, the irrigation line 50 (with emitters) that is inserted through the semi-ring components of the IL clips 2 will be prevented from moving down a line of containers 34.

FIG. 2 is a perspective view of an example irrigation system 2 that includes a pair of irrigation lines 50 that are attached to the rims of a line of containers using IL clips (note that for ease of illustration, the containers are shown as empty containers without potting soil or plants). The irrigation lines 50 may be tubes or conduits, and flexible, for transferring water to the containers and may include emitters (e.g., holes or other mechanisms for dripping or spraying water into the containers).

As illustrated in FIG. 2, the rims 40 of the containers may have a plurality of spaced apart receiving aperture 36. In some cases, having extra receiving aperture 36 dispersed along the rims of the containers may be particularly beneficial when the containers are used to grow young seedlings. For example, suppose seeds are initially planted at the centers of each of the containers in the line of containers illustrated in FIG. 2. Initially, when the seedlings are still very small, the two irrigation lines 50 using the IL clips 2 may be placed near where the seedlings are sprouting using, for example, the inner most apertures 36 of the container rims 40. However, as the seedlings grow into larger plants, the two irrigation lines 50 may be moved outward away from where the young plants are growing by simply unclipping the IL clips from the inner most receiving aperture 36 to the more outwardly located receiving apertures 36. This may permit the young plants to freely grow upward without any impediments as well as to ensure that the plants are being properly hydrated. The use of the IL clips 2 permits efficient disconnection and relocation of the irrigation lines relative to the line of containers 34.

Various embodiments in this disclosure are described in the context of irrigation systems, such as for plant nurseries. However, as will be understood by those skilled in the art after reviewing this disclosure, the embodiments may be suitable for use in other environments (e.g., in the context of other types of liquid distribution systems), and may be modified in the spirit of this disclosure to accommodate those environments.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification but should instead be construed to include all possible embodiments along with the full scope of equivalents to which such claims are entitled. Accordingly, the claims are not limited by the disclosure.

What is claimed is:

1. A clip for attaching an irrigation line to a plant container comprising:
   a semi-ring component having a receiving gap for holding a portion of an irrigation line;
   a pair of elongated leg members spaced from one another by a gap for insertion into a restrictive aperture on a plant container;
   a first press pad disposed on a first side portion of the clip; and
   a second press pad disposed on a second side portion of the clip, wherein the first and second press pads are connected to the elongated leg members, and wherein the clip is comprised of resilient compressible material;
   wherein the pair of elongated leg members defining a gap between the pair of elongated leg members that opens towards a first direction, and the receiving gap of the semi-ring component being an opening for the semi-ring component that opens towards a second direction opposite of the first direction.

2. The clip of claim 1 wherein each of the elongated leg members includes a lower section having a catch member, each catch member protruding laterally outwardly from the lower section.

3. The clip of claim 1 further comprising a shield member extending forward from a front portion of the clip and extending rearward from a rear portion of the clip in substantially flat configuration relative to the forward and rearward directions.

4. The clip of claim 1 further comprising a textured surface on an interior of the semi-ring component.

5. The clip of claim 1 further comprising a first arm member extending in a lateral direction outward from a first one of the pair of leg members and a second arm member extending in an opposite direction from a second one of the pair of leg members, with the first press pad being disposed on an outward end portion of the first arm member, and the second press pad being disposed on an outward end portion of the second arm member, and an outwardly exposed surface on each press pad being disposed further laterally outward relative to a central portion of the clip than an outermost portion of the semi-ring component.

6. The clip of claim 1 wherein each end of the pair elongated leg members is a non-pointed end with a foot member that protrudes laterally outwardly from end portions of the elongated leg members.

7. A clip for attaching an irrigation line to a plant container, the clip comprising:
   a semi-ring component including but not limited to a receiving gap, the receiving gap facing in a first direction configured to receive a portion of the irrigation line;
   a pair of elongated first and second arm members extending in second and third directions, respectively, the second and third directions substantially opposite one another, the second and third directions substantially perpendicular to the first direction;
   a first shield portion including but not limited to a substantially flat surface extending from the first arm in a fourth direction substantially perpendicular to the second direction;
   a second shield portion including but not limited to a substantially flat surface extending from the second arm in the fourth direction; and
   a pair of elongated leg members spaced from one another by a gap for insertion into a restrictive aperture on a plant container, the gap facing a second direction substantially opposite the first direction.

8. The clip of claim 7 further comprising:
   a first press pad disposed on a first side portion of the clip; and
   a second press pad disposed on a second side portion of the clip, wherein the first and second press pads are connected to the elongated leg members, and wherein the clip is comprised of resilient compressible material.

9. The clip of claim 8 wherein the first press pad being disposed on an outward end portion of the first arm member, and the second press pad being disposed on an outward end portion of the second arm member, and an outwardly exposed surface on each press pad being disposed further laterally outward relative to a central portion of the clip than an outermost portion of the semi-ring component.

10. The clip of claim 7 wherein each of the elongated leg members includes a lower section having a catch member, each catch member protruding laterally outwardly from the lower section.

11. The clip of claim 7 further comprising a textured surface on an interior of the semi-ring component.

* * * * *